(12) United States Patent
Ruiz

(10) Patent No.: US 10,782,771 B2
(45) Date of Patent: Sep. 22, 2020

(54) SYSTEM AND METHOD FOR ENERGY USAGE SCALING FOR NETWORKED DEVICES

(71) Applicants: Kabushiki Kaisha Toshiba, Minato-ku (JP); Toshiba TEC Kabushiki Kaisha, Shinagawa-ku (JP)

(72) Inventor: Adiel O. Ruiz, Irvine, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 320 days.

(21) Appl. No.: 15/680,985

(22) Filed: Aug. 18, 2017

(65) Prior Publication Data

US 2019/0056774 A1  Feb. 21, 2019

(51) Int. Cl.
| | |
|---|---|
| *G06F 1/32* | (2019.01) |
| *G06F 1/3287* | (2019.01) |
| *G06F 1/3209* | (2019.01) |
| *G06F 9/4401* | (2018.01) |
| *G06Q 50/06* | (2012.01) |
| *G06F 1/3234* | (2019.01) |

(52) U.S. Cl.
CPC .......... *G06F 1/3287* (2013.01); *G06F 1/3209* (2013.01); *G06F 1/3234* (2013.01); *G06F 9/442* (2013.01); *G06Q 50/06* (2013.01)

(58) Field of Classification Search
None
See application file for complete search history.

(56) References Cited

U.S. PATENT DOCUMENTS

| | | | | |
|---|---|---|---|---|
| 9,772,807 | B1* | 9/2017 | Osadchyy | H04L 41/0853 |
| 2010/0162013 | A1* | 6/2010 | Oh | G06F 1/3203 |
| | | | | 713/310 |
| 2017/0126925 | A1* | 5/2017 | Sasaki | G03G 15/553 |
| 2017/0171400 | A1* | 6/2017 | Zakharov | H04N 1/00042 |
| 2018/0120917 | A1* | 5/2018 | Srinivasan | G06F 1/266 |

* cited by examiner

*Primary Examiner* — Fahmida Rahman
(74) *Attorney, Agent, or Firm* — Ulmer & Berne LLP

(57) ABSTRACT

A system and method for networked device power management includes a processor, memory and a network interface to communicate with a one or more networked data devices. Each networked data device includes one or more of selectable power consumption level states. Data corresponding to power consumption of each networked data device is captured and analyzed to determine power usage trends for each of the devices. The processor then generates a device power consumption level state recommendation for each of the networked data devices in accordance with the power usage trends.

15 Claims, 5 Drawing Sheets

FIG. 5

Save-a-Watt Service
FancyBusinessInc.

Engineering HQ Located in building 003-Big City, CA

We have identified potential energy savings in "EngineeringHQ"

3/2017

[Graph: kWh vs March 1-31] — 510

You can automatically apply recommendations on the devices below by clicking the highlighted text Toshiba MFP000213 — 520
Toshiba EcoMFP002 — 530
LegacyPrinterUsingALotOfElectricity — 540

Adjust standby to 15 minutes (3% energy savings) — 550
Automatically adjust to optimal standby time (10% energy savings) — 560
Request maintenance (15% energy savings) — 570

Export to CSV    Export Raw Data    Import missing data

Welcome Administrator!    Home    Sign out

500

SYSTEM AND METHOD FOR ENERGY USAGE SCALING FOR NETWORKED DEVICES

TECHNICAL FIELD

This application relates generally to energy usage conservation for networked data devices. The application relates more particularly to power saving by selection of various multifunction peripheral wait states based on device use and power consumption.

BACKGROUND

Data devices, such as workstations, servers and document processing devices, are often interconnected via networks. Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Users may send document processing jobs, such as a print request, to one or more networked devices. In a typical shared device setting, one or more workstations are connected via a network. When a user wants to print a document, an electronic copy of that document is sent to a document processing device via the network. The user may select a particular device when several are available. The user then walks to the selected device and picks up their job or waits for the printed document to be output. User time can be wasted if a print job is not ready when the user approaches a device for pickup.

Various networked data devices may be subject to different usage levels and different energy consumption needs. By way of example, with an MFP, a user may typically select an MFP closest to their workstation for printing their documents. Certain users, or groups of users, may print more documents than others. Therefore, certain machines may be used more frequently than others. Some MFP devices may be programmed to enter a sleep mode when they have not been used for a specified time amount. When an MFP is in an always on state, it can begin printing a document just as soon as it receives an electronic file. An always on machine will have parts such as its toner fuser roller maintained at a sufficient temperature to commence rendering immediately. A device in a sleep mode may have to bring the toner fuser roller to temperature before printing. This can take a few seconds, to a few minutes, depending on a device's capabilities. The tradeoff for placing a device in sleep mode is power savings relative to constantly heating the fuser bar.

SUMMARY

In accordance with an example embodiment of the subject application, a system and method for networked device power management includes a processor, memory and a network interface configured to communicate with one or more networked data devices. Each networked data device includes one or more selectable power consumption level states. Data corresponding to power consumption of each networked data device is captured and analyzed to determine power usage trends for each of the devices. The processor then generates a device power consumption level state recommendation for each of the networked data devices in accordance with the power usage trends.

BRIEF DESCRIPTION OF THE DRAWINGS

Various embodiments will become better understood with regard to the following description, appended claims and accompanying drawings wherein:

FIG. 5 is an example embodiment of a user interface provided to an energy monitoring and recommendation service customer.

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

When a location has a number of networked data devise, such as MFPs, any device may enter a power saving or sleep mode after a specified duration of non-use. Some devices may use more power in sleep mode than others, and some devices may use more power in an always-on mode than others. Still other devices may have additional wait modes, such as one or more intermediate power saving levels.

Device usage varies for many reasons. Some printers may have substantially slower page output rate than others. Some departments may print more than others. Some departments may print more during certain times of the day. Some devices may exhibit errors more than others, perhaps resulting in additional device reboots with attendant down time and wasted energy usage.

In accordance with example embodiments herein, networked devices are monitored for energy consumption over time. Analysis of data corresponding to energy consumption of various networked devices over time can lead to better optimized energy consumption by selectively placing devices in various wait states depending on their power consumption. This may further be supplemented by information relative to device loading or device errors.

Figure 1:
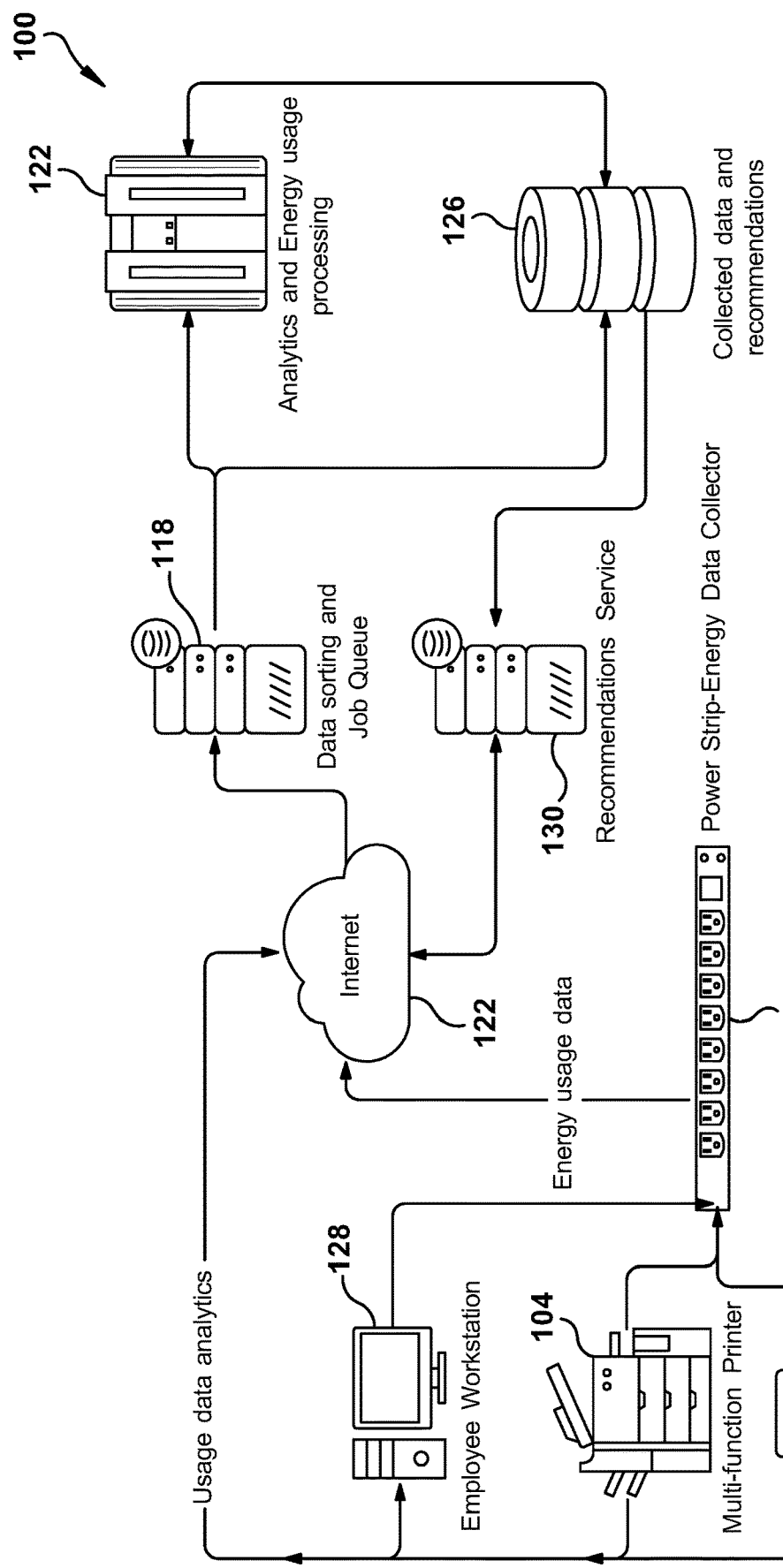
FIG. 1 is an example embodiment of an energy usage scaling system.

In accordance with the subject application, FIG. 1 illustrates an example embodiment of an energy usage scaling system 100 for networked data devices such as MFP 104, employee workstation 128 and server 110. Power usage for each networked device is monitored by any suitable internal or external power meter, exemplified by energy data collector 114. Power usage data from monitored devices is communicated to a networked server 118, suitably a cloud server connected to many different devices through a LAN or WAN, such as Internet 122. Collected data is analyzed, suitably via analytics/machine learning processing by a suitable computing server 122, and collected data and device setting recommendations are stored in a data store 126 such as a database. Recommended settings are suitably relayed, such as via a recommendation service server 130 back to individual devices for implementation or to an administrator who can approve or disapprove any recommendations.

Figure 2:
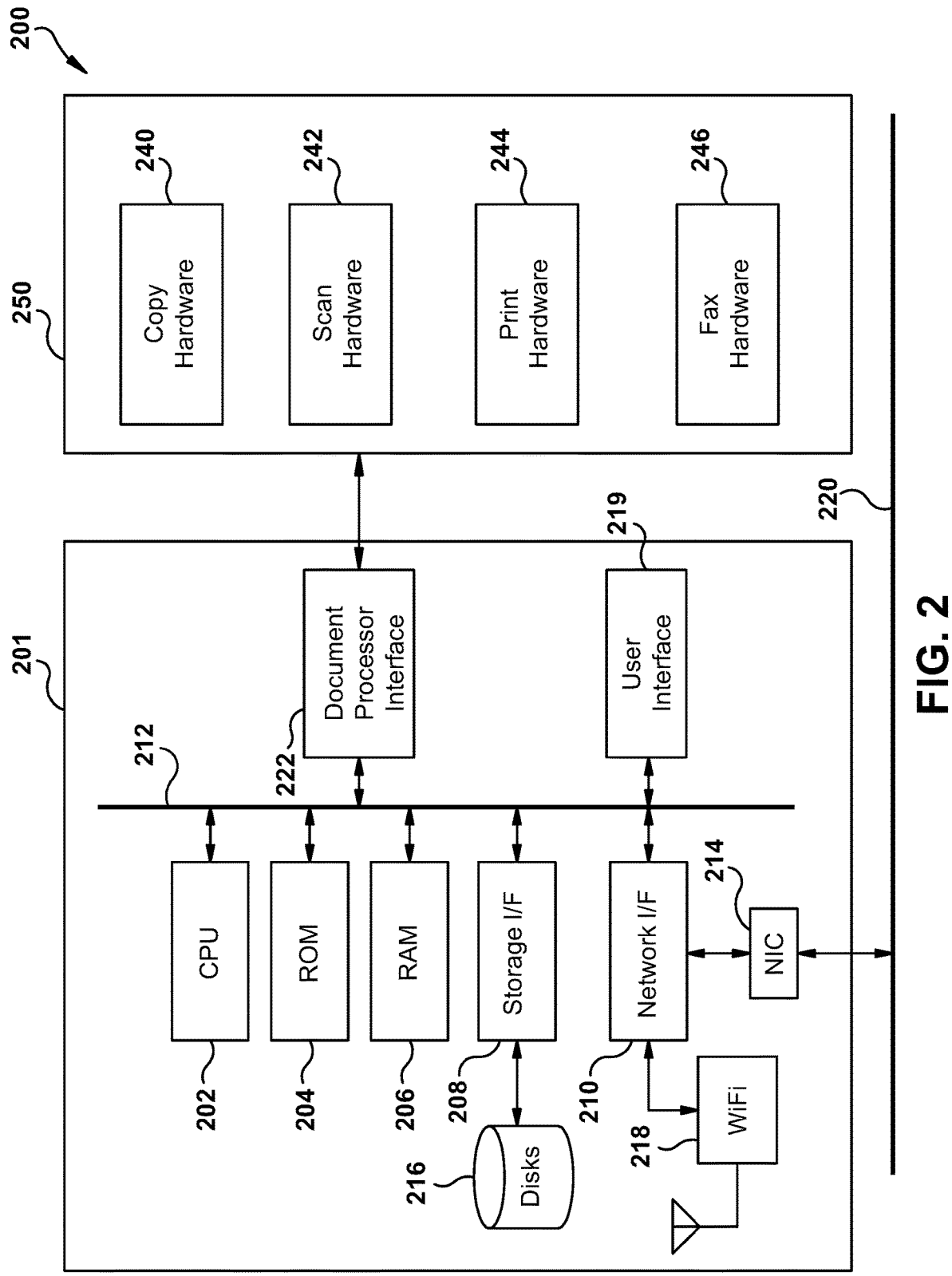
FIG. 2 is an example embodiment of a networked digital device.

Turning now to FIG. 2 illustrated is an example embodiment of a networked digital device comprised of document rendering system 200 suitably comprised within an MFP, such as with MFP 104 of FIG. 1. Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightening, telephone line, or the like. Processor 202 is also in data communication with one or more sensors 219 which provide data relative to a state of the device or associated surroundings, such as device temperature, ambient temperature, humidity, device movement and the like.

Processor 202 can also be in data communication with any suitable user input/output (I/O) interface which provides data communication with user peripherals, such as displays, keyboards, mice, track balls, touch screens, or the like. Hardware monitor 221 suitably provides device event data, working in concert with suitably monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216 of FIG. 2.

Also in data communication with data bus 212 is a document processor interface 222 suitable for data communication with MFP functional units 250. In the illustrate example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Controller 201 is suitably provided with an embedded web server system for device configuration and administration. A suitable web interface is comprised of TOPACCESS Controller (sometimes referred to in the subject illustrations as "TA"), available from Toshiba TEC Corporation.

Figure 3:
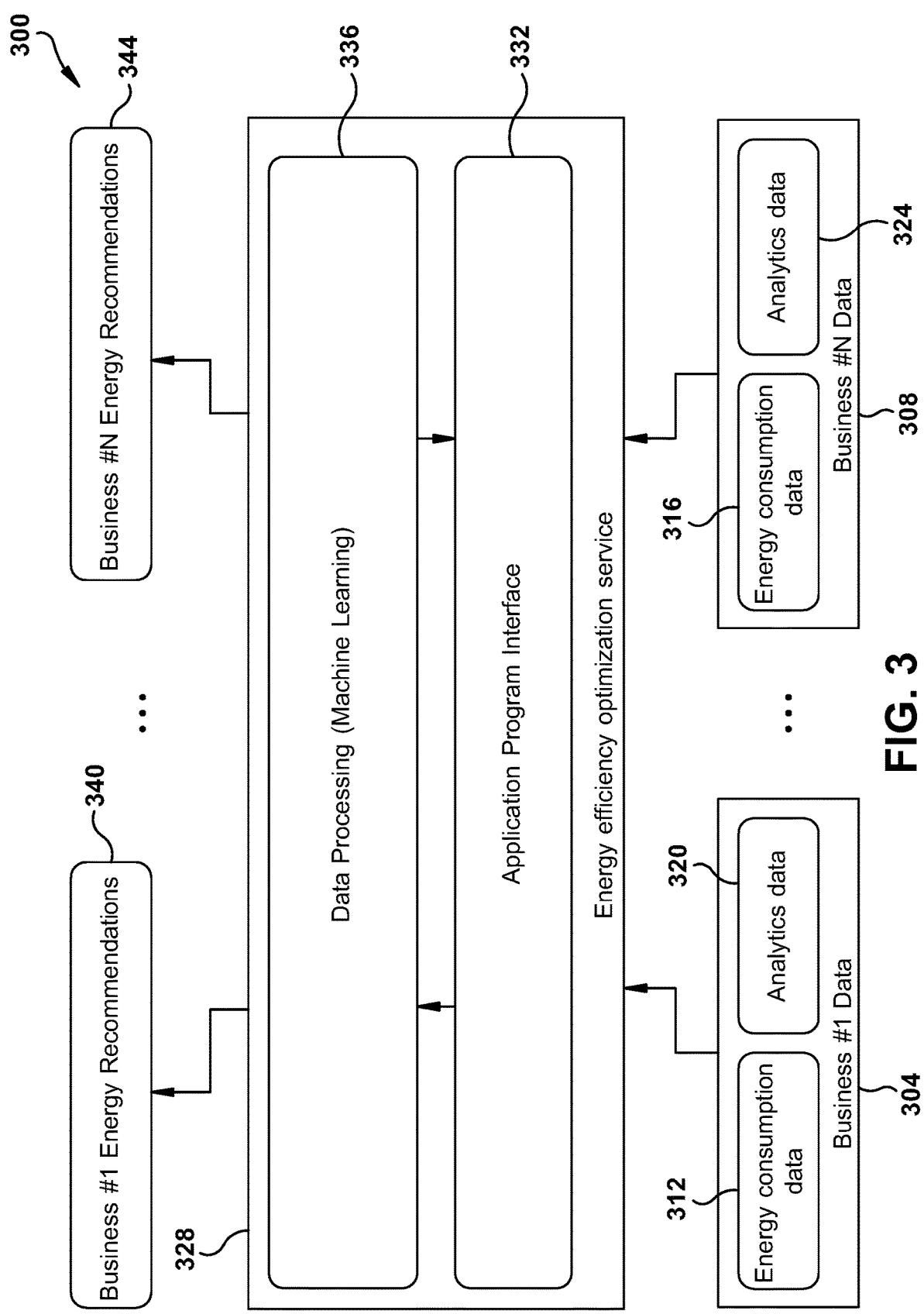
FIG. 3 is a software module block diagram of an example embodiment of an energy usage scaling system for networked device energy conservation.

Referring next to FIG. 3, illustrated is a software module block diagram 300 for an embodiment of an energy usage scaling system for networked device energy conservation for one or more business as illustrated by business 1, 304 through business N, 308. Energy consumption data, suitably consumption over time 312, 316 is suitably accumulated with analytic data modules 320, 324, which may include peak usage data, print count, device error information and the like. Energy consumption data and analytic data are communicated to a server module 328, suitably part of an energy efficiency optimization cloud service, via an application program interface module 332. Received data is processed via data processing module 336 and device setting recommendation or actual device settings are relayed to a system administrator as recommendations 340, 344. Alternatively, settings may be directed directly to devices themselves with instructions to set their default wait states accordingly.

Figure 4:
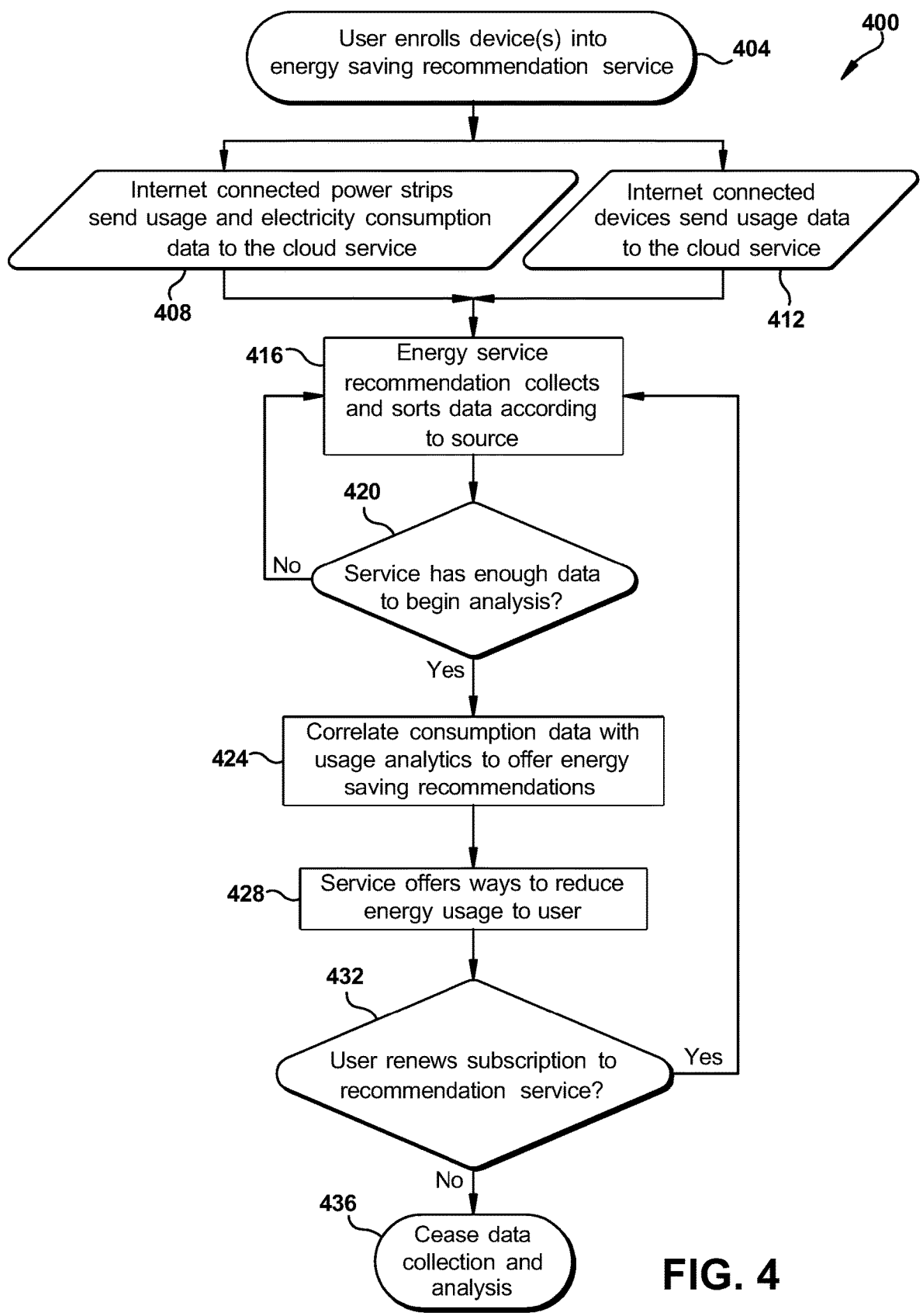
FIG. 4 is a flowchart of an example embodiment of an energy usage scaling system for networked device energy management.

FIG. 4 illustrates a flowchart 400 of operations of an embodiment of an energy usage scaling system for networked device energy management. The process commences at block 404 where a user enrolls one or more network devices into an energy saving recommendation service. Energy consumption data is sent to the service from a separate measurement device, such as a power strip, at block 408 or directly from a self-monitored device at block 412. The energy service analyzes and sorts the data at block 416 and a determination if enough data, over a sufficient duration, is made at block 420. If there is not sufficient data, the process returns to block 416 until this condition is met. If there is sufficient data, consumption data is correlated with usage analytics at block 424, and the service provides its energy savings recommendations at block 428. If a subscription is maintained as determined by block 432, the process returns to block 416 and updated analysis and recommendations are made. If not, the process terminates at block 436.

FIG. 5 illustrates an example embodiment of a user interface 500 such as may be provided to an energy monitoring and recommendation service customer. Energy consumption data is suitably illustrated graphically at 510. Monitored devices 520, 530 and 540 correspond to selectable setting recommendations 550, 560 and 570 correspondingly. If an administrator accepts a recommendation, such as by clicking on it, the recommendation is communicated to the corresponding machine for implementation as its setting. Example recommendations can include power consumption level states such as a delayed activation mode, a standby mode, a power-off mode, an energy-saving mode, and an always-on mode.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A networked device power management system comprising:
   a processor and associated memory; and
   a network interface configured for data communication with a plurality of networked data devices comprised of multifunction peripherals,
   wherein each data device includes a plurality of selectable power consumption level states, wherein the network interface is further configured to receive power consumption data corresponding to power usage for each of the plurality of networked data devices, wherein the network interface is further configured to receive device operation data including a page count of pages printed by the multifunction peripherals over a time period and data corresponding to device errors experienced in the multifunction peripherals over the time period, wherein the processor is configured to determine power usage trends for each of the plurality of networked data devices in accordance with received power consumption data and the received device operation data, wherein the processor is further configured to generate a device power consumption level state recommendation for each of the networked data devices in accordance with the power usage trends, and the processor configured to generate a prompt on an associated display corresponding to each said device power consumption level state recommendation and an input configured to receive selection data corresponding to at least one user-selected acceptance of the device power consumption level state recommendation.

2. The device of claim 1 wherein the device power consumption level states include a delayed activation mode, a standby mode and an always-on mode.

3. The device of claim 2 wherein a device power consumption level state recommendation is comprised of a device power-off recommendation.

4. The device of claim 2
wherein the network interface is further configured to receive job data from each of the multifunction peripherals corresponding to document processing operations performed, and
wherein the processor is further configured to determine the power usage trends in accordance with the received job data.

5. The device of claim 1 wherein the processor is further configured to determine the power usage trends in accordance with application of machine learning on the received power consumption data.

6. The device of claim 1 wherein the processor is further configured to communicate a power state setting instruction to at least one multifunction peripheral in accordance with the received selection data.

7. The system of claim 1 wherein the plurality of selectable power consumption level states include an energy-saving state comprised of a multifunction peripheral standby mode.

8. The system of claim 1 wherein the plurality of selectable power consumption level states include an energy-saving state comprised of a shutdown of the multifunction peripheral.

9. The system of claim 1 wherein the plurality of selectable power consumption level states include an energy-saving state comprised of a delayed activation mode for the multifunction peripheral.

10. A method of managing networked data device power consumption comprising:
receiving into a memory, via a network interface, power consumption data from each of a plurality of networked data devices comprised of multifunction peripherals, wherein each networked data device includes a plurality of selectable power consumption level states;
receiving device operation data including a page count of pages printed by the multifunction peripherals over the time period and data corresponding to device errors experienced in the multifunction peripherals over the time period,
determining, via a processor, power usage trends for each of the plurality of networked data devices in accordance with received power consumption data and the device operation data;
generating a device power consumption level state recommendation for one of the selectable power consumption level states for each of the networked data devices in accordance with the power usage trends;
generating a prompt on an associated display corresponding to each of the device power consumption level state recommendations; and
receiving selection data corresponding to at least one user-selected acceptance of the device power consumption level state recommendation.

11. The method of claim 10 wherein the power consumption level states include a delayed activation mode, a standby mode and an always-on mode.

12. The method of claim 11 wherein a device power consumption level state recommendation is comprised of a device power-off recommendation.

13. The method of claim 11 further comprising:
receiving job data for each of the networked data devices corresponding to document processing operations; and
determining the power usage trends in accordance with the received job data.

14. The method of claim 10 further comprising determining the power usage trends in accordance with application of machine learning on the received power consumption data.

15. The method of claim 10 further comprising communicating a power consumption level state setting instruction to at least one networked data device in accordance with the received selection data.

* * * * *